United States Patent
Palanivelu et al.

(10) Patent No.: US 7,751,495 B1
(45) Date of Patent: Jul. 6, 2010

(54) EQUAL POWER OUTPUT SPATIAL SPREADING MATRIX FOR USE IN A WIRELESS MIMO COMMUNICATION SYSTEM

(75) Inventors: Arul Durai Murugan Palanivelu, Sunnyvale, CA (US); Hui-Ling Lou, Sunnyvale, CA (US); Kedar Shirali, Sunnyvale, CA (US); Rohit U. Nabar, Sunnyvale, CA (US); Atul Salhotra, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 410 days.

(21) Appl. No.: 11/851,237

(22) Filed: Sep. 6, 2007

Related U.S. Application Data

(60) Provisional application No. 60/824,701, filed on Sep. 6, 2006.

(51) Int. Cl.
   *H04B 7/02* (2006.01)
   *H04L 23/02* (2006.01)
   *H04B 1/40* (2006.01)

(52) U.S. Cl. .................. 375/267; 375/265; 455/24; 455/69; 455/88

(58) Field of Classification Search ............. 375/141, 375/146, 259, 260, 262, 265, 267, 299; 455/24, 455/500, 68, 69, 88, 553.1, 101, 103
See application file for complete search history.

(56) References Cited

U.S. PATENT DOCUMENTS

| | | | |
|---|---|---|---|
| 6,760,388 B2 | 7/2004 | Ketchum et al. | |
| 7,065,146 B1 | 6/2006 | Lou et al. | |
| 7,302,238 B2 * | 11/2007 | Fujil | 455/101 |
| 7,386,076 B2 * | 6/2008 | Onggosanusi et al. | 375/347 |
| 7,570,696 B2 * | 8/2009 | Maltsev et al. | 375/260 |
| 2005/0281350 A1 * | 12/2005 | Chae et al. | 375/267 |
| 2006/0209814 A1 * | 9/2006 | Fujii | 370/369 |

OTHER PUBLICATIONS

"Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band, *Institute of Electrical and Electronics Engineers, Inc.*, (2003).

(Continued)

*Primary Examiner*—Young T. Tse

(57) ABSTRACT

A wireless communication system uses a spatial spreading matrix to simultaneously transmit various different streams of encoded symbol data simultaneously via multiple transmission antennas, wherein the spatial spreading matrix is designed to assure that the different transmission antennas provide equal power output in the presence of both correlated and uncorrelated data within the different encoded symbol streams. The use of this spatial spreading matrix reduces or eliminates the condition in which a particular one of the transmission antennas needs to operate at an output power that is significantly higher than the others of the transmission antennas, which might lead to saturation of, or to the non-linear or abnormal operation of a power amplifier associated with the particular transmission antenna, resulting in improper amplification for that particular transmission antenna.

67 Claims, 5 Drawing Sheets

OTHER PUBLICATIONS

Mujtaba, S., "TGn Sync Proposal Technical Specification" (2005).

"Part 16: Air Interface for Fixed Broadband Wireless Access Systems- Amendment 2: Medium Access Control Modifications and Additional Physical Layer Specifications for 2-11 GHz," *The Institute of Electrical and Electronics Engineers, Inc.*, (2003).

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band, *The Institute of Electrical and Electronics Engineers, Inc.*, (1999).

"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band," *The Institute of electrical and electronics Engineers, Inc.*, (1999).

\* cited by examiner

EQUAL POWER OUTPUT SPATIAL SPREADING MATRIX FOR USE IN A WIRELESS MIMO COMMUNICATION SYSTEM

RELATED APPLICATION

This is a regular-filed application which is based on and claims priority to U.S. Provisional Patent Application Ser. No. 60/824,701, entitled "Spatial Spreading Matrix Design for Equal Power Output on All Transmit Antennas," which was filed on Sep. 6, 2006, the entire disclosure of which is hereby incorporated by reference herein.

FIELD OF TECHNOLOGY

The present invention relates generally to wireless communication systems and, more particularly, to a system and method for the simultaneous transmission of multiple streams of information or data in a multiple-input, multiple-output wireless communication system.

DESCRIPTION OF THE RELATED ART

An ever-increasing number of relatively cheap, low power wireless data communication services, networks and devices have been made available over the past number of years, promising near wire speed transmission and reliability. Various wireless technologies are described in detail in the 802.11 IEEE Standard, including for example, the IEEE Standard 802.11a (1999) and its updates and amendments, the IEEE Standard 802.11g (2003), as well as the IEEE Standard 802.11n now in the process of being adopted, all of which are collectively incorporated herein fully by reference. These standards have been or are in the process of being commercialized with the promise of 54 Mbps or more effective throughput, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Transmitters used in the wireless communication systems that are compliant with the aforementioned 802.11a/802.11g/802.11n standards as well as other standards such as the 802.16a IEEE Standard, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain signal. Thereafter, the baseband processor performs demodulation and frequency domain equalization (FEQ) to recover the transmitted symbols, and these symbols are then processed with an appropriate FEC decoder, e.g. a Viterbi decoder, to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information describing one or more characteristics of each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. As is known, the use of MIMO technology produces significant increases in spectral efficiency, throughput and link reliability, and these benefits generally increase as the number of transmission and receive antennas within the MIMO system increases.

In particular, in addition to the frequency channels created by the use of OFDM, a MIMO channel formed by the various transmission and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

It is known that the use of multiple spatial channels in a MIMO system significantly increases throughput of the system as multiple streams of data can be sent through the system simultaneously. Thus, the use of multiple antennas within the MIMO system allows the use of multiple spatial streams, each of which includes streams of encoded data that are independently modulated and transmitted from the antennas. Generally speaking, the number of spatial streams is less than or is equal to the number of transmit antennas. When the number of transmit antennas is equal to the number of spatial streams, the modulated symbols of the spatial stream are spread evenly across the transmission antennas (i.e., one spatial stream per antenna) and are transmitted in parallel from the transmission antennas. However, when the number of spatial streams is less than number of transmission antennas, a spatial spreading matrix is used to map the spatial streams onto the transmission antennas to provide for maximum usage of the transmission antennas and thus maximum throughput. Generally speaking, it is possible to use a different spatial spreading matrix for each of the separate or possible tones or combinations of tones of the modulation system (wherein each tone relates to a different one of the possible symbols) to thereby allocate or to provide a spatial spreading matrix for use with the system that is optimally configured to send each of the separate tones. However, this system requires storing of a significant number of different spatial spreading matrices based on the tones, the number of tones and the combinations of tones sent in the system, and thus requires a significant amount of memory to store the spatial spreading matrixes. This requirement is especially true in the larger systems that have a significant number of spatial streams and/or transmission antennas. Generally speaking, in these systems as well as in other systems, the spatial spreading matrix is chosen to have orthogonal columns, so as to allocate the same amount of energy in each spatial stream.

However, from an implementation perspective, it is easier to design a transmission system having a single spatial spreading matrix that is used for all of the possible tones or combinations of tones. In the past, it was known and generally accepted to use a discrete Fourier transform (DFT) unity matrix as the spatial spreading matrix when the number of spatial streams was the same as the number of transmission antennas. Moreover, it has been typical to use only a portion of the DFT unity matrix (determined for the number of transmission antennas being used) when the number of spatial streams is less than the number of transmission antennas. Thus, in a system in which two spatial streams are transmitted simultaneously through three transmission antennas, two columns of the three-by-three DFT unitary matrix might be used as the spatial spreading matrix.

While such a system is generally acceptable when the data being sent within the separate signal streams is uncorrelated, and thus is random with respect to one another, problems can arise when the data being sent between the separate signal streams is correlated, which frequently occurs in communication systems that have predefined headers such as in communication systems using the 802.11(x) standards. In this case, significant portions of the symbol bit streams within the two separate spatial streams are correlated with one another, and can result in one of the transmission antennas transmitting a significantly higher power than the other transmission antennas. Thus, for example, when three transmission antennas are used to transmit two separate bit or symbol streams, and the two separate bit or symbol streams have the identical data, the first transmission antenna might end up being used to transmit at, for example, four times the power as the other two transmission antennas.

This unequal power situation causes a problem because the power amplifiers used in transmission systems generally have non-linear characteristics when operated well outside of a normal operating range. Thus, if two transmission antennas transmit at a particular power which is within the normal operating range of the associated power amplifiers, and one of the transmission antennas transmits at four times that power, this last transmission antenna may operate in a non-linear or abnormal region of the power amplifier, causing the power amplifier of this last transmission antenna to fail to properly amplify the signal as compared to the amplification provided by the other two transmission paths. These non-linearities result, on the receiver side of the transmission system, in distortions within the data, which leads to possible improper decoding of symbols at the receiver side, resulting in high and possibly unacceptable data error rates.

SUMMARY

A multiple-input, multiple-output wireless transmission system and method uses a spatial spreading matrix to simultaneously transmit two or more encoded spatial data streams via three or more transmission antennas, wherein the spatial spreading matrix satisfies a number of predetermined constraints to assure that the transmission antennas transmit roughly equal power in the presence of either uncorrelated data or correlated data within the separately encoded spatial streams. In particular, the spatial spreading matrix has components associated with each of a row dimension having a number of rows equal to the number of transmission antennas to be used to transmit the encoded spatial streams of data and a column dimension having a number of columns equal to the number of encoded spatial streams of data to be transmitted. Here, of course, the specific orientation of the row and column dimensions is arbitrary, so that the row dimension can be a horizontal dimension with the column dimension being a vertical dimension, or so that the row dimension can be a vertical dimension with the column dimension being a horizontal dimension.

In any event, the spatial spreading matrix is determined or computed so that the squared vector norm of a row of the spatial spreading matrix is the same for each row and is equal to a constant and, in particular, equals the sum of the squared norms of the row components of the spatial spreading matrix, when the power amplifiers of all the transmit antennas have similar operating behavior. Otherwise, the squared row norms of different rows of the spatial spreading matrix are proportional to the linear operating regions of the power amplifiers corresponding to the transmit antennas. Additionally, the spatial spreading matrix is determined so that the output power for each row of the spatial spreading matrix is equal to a constant when the symbol being transmitted is 1 or −1. Moreover, the spatial spreading matrix may be designed so that the squared norm of each column of the spatial spreading matrix is the same, and equal to a constant (that is, the squared norm for each of the spatial streams is equal to a constant). To implement this constraint, the sum of the squared norms of each column component of a column of the spatial spreading matrix is the same for each column. Moreover, the inner product of any two different columns of the spatial spreading matrix equals zero.

Using a spreading matrix which satisfies each of these five constraints or some sub-combination thereof provides a spatial spreading matrix which produces equal/appropriate power output at each of the transmission antennas regardless of whether the data within the symbols being transmitted are correlated or are uncorrelated, thereby leading to better power amplification across the entire transmission system. In particular, this system and method reduce or eliminate the condition in which a particular one of the transmission antennas needs to operate at an output power that is significantly higher than the other of the transmission antennas, which might lead to saturation of the power amplifier associated with the particular transmission antenna or which might lead to the non-linear or abnormal operation of the power amplifier associated with the particular transmission antenna, leading to improper symbol decoding at the receiver.

DETAILED DESCRIPTION

While the transmission techniques described herein for processing and effecting a wireless data transmission are described as being used in communication systems that use one of the IEEE Standard 802.11(x) communication standards, these techniques may be used in various other types of wireless communication systems and are not limited to those conforming to one or more of the IEEE Standard 802.11(x) standards.

Figure 1:
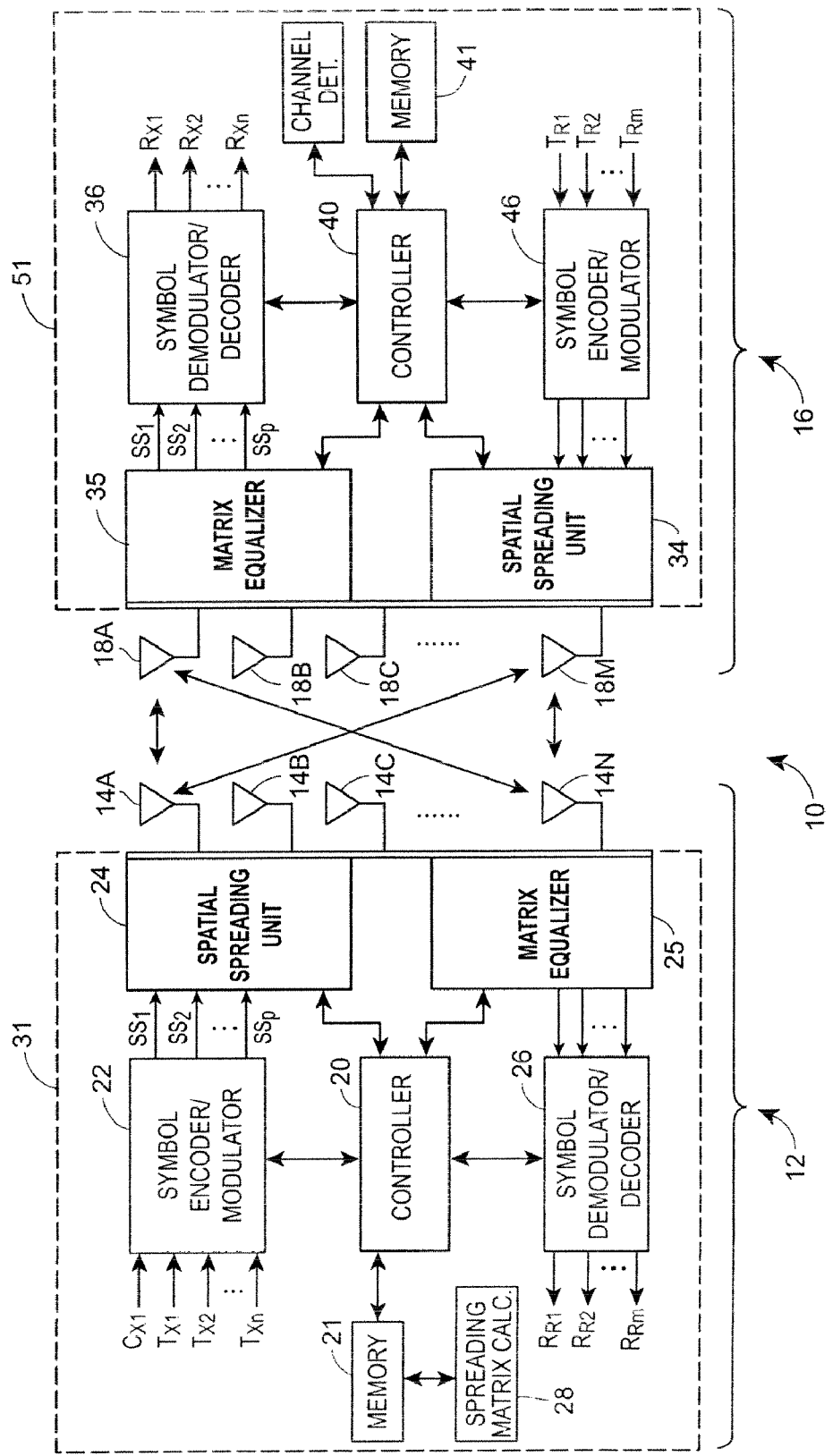
FIG. 1 is a block diagram of a wireless MIMO communication system that determines and uses a spatial spreading matrix to provide for equal power output at all of the transmission antennas of a transmitter.

Referring now to FIG. 1, a MIMO communication system 10 is illustrated in block diagram form as generally including a single transmitter 12 having multiple transmission antennas 14A-14N and a single receiver 16 having multiple receiver antennas 18A-18M. The number of transmission antennas 14A-14N can be the same as, more than, or less than the number of receiver antennas 18A-18M. As shown in FIG. 1, the transmitter 12 may include a controller 20 coupled to a memory 21, to a symbol encoder and modulator unit 22 and to a spatial spreading block 24. The transmitter 12 may also include a matrix equalizer 25 and a symbol demodulator and decoder unit 26 to perform demodulation and decoding of signals received via the antennas 14A-14N in a receive mode. Additionally, in some instances, the transmitter 12 may include a spreading matrix calculation unit 28.

The controller 12 may be any desired type of controller and the controller 12 and the spreading matrix calculation unit 28 may be implemented as one or more standard multi-purpose, programmable processors, such as micro-processors, as application specific integrated circuits (ASICs), etc., or may be implemented using any other desired types of hardware, software and/or firmware. Likewise, the spatial spreading block 24, and the matrix equalizer 25 may be implemented using known or standard hardware and/or software elements. If desired, various of the transmitter components, such as the controller 20, the modulator unit 22, the demodulator unit 26, the spreading matrix calculation unit 28, the spatial spreading block 24 and the matrix equalizer 25 may be implemented in the same or in different hardware devices, such as in the same or different processors. Additionally, each of these components of the transmitter 12 may be disposed in a housing 31 (shown in dotted relief in FIG. 1) and the routines or instructions for implementing the functionality of any of these components may be stored in the memory 21 or within other memory devices associated with the individual hardware used to implement these components.

Likewise, if desired, one or more pre-calculated or predetermined spreading matrices may be stored in the memory 21 and used in the spreading matrix block 24 at various times or under various different conditions. Thus, for example, a different pre-calculated or predetermined spatial spreading matrix may be stored for each of a number of possible combinations of encoded spatial streams of data to be transmitted and transmission antennas 14 to be used to simultaneously transmit these encoded spatial streams of data. Thus, for example, a different spatial spreading matrix may be calculated and stored for two spatial streams of data being sent via three of the transmission antennas 14, for two spatial streams of data being sent via four of the transmission antennas 14, for three spatial streams of data being sent via five transmission antennas 14, etc. In this manner, the communication system 10 may optimally send different numbers of spatial streams of data at different times, depending on the load of the system. Moreover, the communication system 10 may also use these various different pre-stored or pre-calculated spatial spreading matrices to account for or to adapt to the loss of one or more of the transmission antennas 14 to be used in sending data within the communication system 10.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. If desired, the same control signal or a different control signal may be used to determine the CSI for each frequency and/or spatial channel used in the MIMO communication system 10.

The symbol encoder and modulator unit may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more encoded streams of symbols $SS_1$, $SS_2$, ... $SS_p$, to be modulated and sent from the transmitter 12 to the receiver 16. While the symbol streams $SS_1$-$SS_p$ may be modulated using any desired or suitable QAM technique, such as using 64 QAM, these symbols may be modulated in any other known or desired manner including, for example, using any other desired phase and/or frequency modulation techniques. In any event, the modulated encoded symbol streams $SS_1$-$SS_p$ are provided by the symbol encoder and modulator unit 22 to the spatial spreading block 24 for processing before being transmitted via the antennas 14A-14N. While not specifically shown in FIG. 1, the modulated symbol streams $SS_1$-$SS_p$ may be processed by the spatial spreading block 24 that implements a spatial spreading matrix in accordance with a transmission technique more specifically described below, before being up-converted to the RF carrier frequencies associated with an OFDM technique (in one or more stages). Upon receiving the modulated signals, the spatial spreading block 24 processes the modulated signals by injecting delays and/or gains into the modulated signals based on a spatial spreading matrix which may be provided by, for example, the controller 12, to thereby perform mixing and transmission of the spatial streams of data across the transmission antennas 14A-14N.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$. In particular, a controller 40 or other unit within the receiver 16, such as a channel determination unit 39, may process the received control signal $C_{x1}$ and develop therefrom a measured description of the forward channel between the transmitter 12 and the receiver 16 by determining or characterizing the propagation effects of the forward channel on the signal $C_{x1}$ as it traveled through the forward channel. In any event, a symbol demodulator and decoder unit 36, under control of the controller 40, may decode and demodulate the received symbol strings $SS_1$-$SS_p$ as recovered by the matrix equalizer 35. In this process, these signals may be downconverted to baseband. Generally, the demodulator and decoder unit 36 may operate to remove effects of the forward channel based on the CSI as well as to perform demodulation on the received symbols in each symbol stream $SS_1$ $SS_p$ to produce a digital bit stream for each stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ encoded and modulated using any desired encoding and modulation techniques. The receiver 16 may also provide one or more known test or control signals $C_{R1}$ to the symbol encoder/modulator unit 46 to be sent to the transmitter 12 to enable the transmitter 12 to determine a measured description of the reverse channel between the receiver 16 and the transmitter 12. The encoded and modulated symbol stream may then be upconverted and processed by a spatial spreading block 34 which may use a spatial spreading matrix developed according to the principles described herein based on the number of symbol streams to be sent simultaneously and the number of transmission antennas 18 to be used. The output of the spatial spreading block 34 is then transmitted via the receiver antennas 18A-18N to, for example, the transmitter 12, thereby implementing the reverse link. As shown in FIG. 1, each of the receiver components may be disposed in a housing 51.

The matrix equalizer 25 and the demodulator/decoder unit 26 within the transmitter 12 operate similarly to the matrix equalizer 35 and the demodulator/decoder unit 36 of the receiver 16 to demodulate and decode the symbol streams transmitted by the receiver 16 to produce the recovered signals $R_{R1}$-$R_{Rm}$. Here again, the matrix equalizer 25 may process the received signals in any known manner to enhance the separation and therefore the reception of the various symbol streams transmitted by the antennas 18A-18M. Of course, the CSI or other measured description of the forward channel for the various OFDM channel(s) may be used to process or decode the received signals.

As indicated above, it is desirable to use a spatial spreading matrix which produces a power output proportional to the linear operating regions of the power amplifiers for each of the transmission antennas under all conditions, including when the data within the separate symbol streams $SS_1$-$SS_p$ is either correlated or uncorrelated. Typically, any matrix with orthogonal columns is used as a spreading matrix, because such a matrix allocates the same energy to each steam. Generally speaking, much of the information or data within the data packets of the streams of data being sent using, for example the 802.11n standard, is uncorrelated, as the data in one symbol stream it is not related to data in other symbols steams, in which case these spatial spreading matrices work as intended. However, there are certain portions of the data packets used in the 802.11n standard which may contain highly correlated data across spatial streams, including packet header information within the data packets of the various different symbol streams. For example, the HT-SIG and the HT-LTF portion of the data packets of the 802.11n standard results in spatial streams that are not uncorrelated on a per-OFDM symbol basis. In fact, during the HT-SIG section, all spatial streams are identical while, during a particular HT-LTF section, any two spatial symbols are either identical or are negatives of one another. These situations result in highly correlated data within the various spatial data streams being transmitted which can result, using many prior art transmission techniques, in a condition in which one of the transmission antennas used to transmit the separate data streams operates at a significantly different power output level than other ones of the antennas, thereby potentially leading to transmission and decoding problems.

A spatial spreading matrix that provides for power output that is proportional to the operating regions of the corresponding power amplifiers across all of the transmission antennas of a transmission system when transmitting correlated and uncorrelated data within two or more spatial streams of data being sent simultaneously via two or more transmission antennas may be determined as a spatial spreading matrix that satisfies five separate constraints, as explained in more detail below. In particular, when the spatial spreading matrix is not a square matrix because the number of transmission antennas is greater than the number of spatial streams, the spatial spreading matrix will still produce equal power output across the antennas in all cases when it is configured or determined so as to satisfy a combination of and, preferably, all five of separate constraints discussed below. Thus, any spatial spreading matrix which satisfies all of these constraints (or in some cases some combination of a sub-set of these constraints) can be used in the spatial spreading block 24 of FIG. 1 to deliver equal or appropriately proportional power output across the separate transmission antennas 14 in all conditions, that is when the data or symbols being sent are either correlated or uncorrelated.

In particular, the goal is to design a spatial spreading matrix Q which is the same for all tones k so that the spatial spreading matrix for each tone $Q_k$=Q. The five constraints which are defined below generally in an equation format, may be used to design or calculate a spatial spreading matrix which reaches this goal. In particular, when the data streams are uncorrelated, the transmit power of the antenna during the data segment of a packet is proportional to the square of the $i^{th}$ row norm of the spatial spreading matrix Q because the data streams are independent. If the power amplifiers for all of the transmitters have similar performance behavior, the spatial spreading matrix Q should have equal row norms for all of the number of transmitter $N_{TX}$ rows of the matrix Q. Otherwise, the output power of some transmission antennas may be significantly higher than the others, leading to high distortion due to inherent non-linear input-output characteristics of typical power amplifiers. This requirement leads to the first three constraints defined below.

The first constraint, as defined in equation (1) below, basically requires that the sum of the squared norms of the column components of a column of the spatial spreading matrix be the same for all of the spatial streams, i.e., for each column of the spatial spreading matrix. This constraint may be defined mathematically as:

$$\sum_{t=1}^{N_{TX}} |Q(t,l)|^2 = C, \quad (1)$$

for each and every spatial stream $l = 1 \ldots N_{SS}$ wherein:

$N_{TX}$=number of transmitters;

$N_{SS}$=number of spatial streams;

C=a constant; and

Q(t,l)=the spatial spreading matrix component at row t, column l.

The second constraint, as defined in equation (2) below, requires that the inner product of any two different columns of the spatial spreading matrix be equal to zero for every set of two different columns (i.e., for every set of two columns which are not the same column). Generally speaking, this constraint means that the columns of the spatial spreading matrix define orthogonal vectors with respect to each other, thereby leading to a zero cross product between any two different columns. This constraint can be defined mathematically as:

$$\sum_{t=1}^{N_{TX}} Q(t,l)Q^*(t,m) = 0, \quad \text{for all } l \neq m \quad (2)$$

wherein:

$N_{TX}$=number of transmitters;

Q(t,l)=the spatial spreading matrix component at row t, column l; and

Q*(t,m)=the component of the transpose of the spatial spreading matrix at row t, column m.

The third constraint, as defined in equation (3) below, requires that the sum of the squared norms of the row components of a row of the spatial spreading matrix is equal to a constant, and is the same for each of the rows of the spatial spreading matrix, when all the transmit antennas have power amplifiers with similar operating behavior. The constant, defined in equation (3) below as "A," need not be zero but can instead be non-zero, although this constant should be the same for every row. This third constraint can be defined mathematically as:

$$\sum_{l=1}^{N_{SS}} |Q(t,l)|^2 = A, \quad \text{and is same for all } t = 1 \ldots N_{TX}. \quad (3)$$

wherein:

$N_{SS}$=number of spatial streams;

$N_{TX}$=number of transmitters;

Q(t,l)=the spatial spreading matrix component at row t, column l; and

A=a constant.

If the transmit antennas have power amplifiers that have different linear operating regions, then the ratio of sum of the squared norms of the row components of a row, for different rows of the spatial spreading matrix, is the same as a constant sequence designed based on the linear operating regions of the power amplifiers, denoted here by $A_1, A_2, \ldots, A_{NTX}$. This constraint is defined mathematically as:

$$\sum_{l=1}^{N_{SS}} |Q(t,l)|^2 = A_t B, \quad \text{for all } t = 1 \ldots N_{TX}. \quad (3a)$$

wherein:

$N_{SS}$=number of spatial streams;

$N_{TX}$=number of transmitters;

Q(t,l)=the spatial spreading matrix component at row t, column l; and

B=a constant.

Generally speaking, in the past, non-square spatial spreading matrices which were based on a unitary matrix (e.g., which were simply portions of a DFT matrix), satisfied these three constraints. Furthermore, a spatial spreading matrix that satisfies these three constraints works adequately to transmit different symbol streams when the data in the symbol streams is uncorrelated.

However, the following two constraints are useful when spatial streams having correlated data are sent simultaneously via the same transmission system, which is frequently the case with, for example, the HT-SIG and HT-LTF portions of data packets sent using the 802.11n standard. The fourth constraint as defined in equation (4) below requires that the squared norm of the sum of the row components of a row of the spatial spreading matrix is equal to a constant for each row of the spatial spreading matrix, and in particular, is equal to the same constant as the sum of the squared norms of the row components defined by equation (3), when all the transmit antennas have power amplifiers with similar operating behavior. This fourth constraint is related to the third constraint in that it requires that, for a particular row, the sum of the squared norms for that row is equal to the squared norm of the sum of the components of that row. The fourth constraint can be defined mathematically as:

$$\left| \sum_{l=1}^{N_{SS}} Q(t,l) \right|^2 = A, \quad \text{and is same for all } t = 1 \ldots N_{TX}. \quad (4)$$

wherein:

$N_{SS}$=number of spatial streams;

Q(t,l)=the spatial spreading matrix component at row t, column l; and

A=a constant.

If the transmit antennas have power amplifiers that have different linear operating regions, then the ratio of squared norm of the sum of the row components of a row, for different rows of the spatial spreading matrix, is the same as the constant sequence designed based on the linear operating regions of the power amplifiers: $\{A_1, A_2, \ldots, A_{NTX}\}$. This constraint is defined mathematically as:

$$\left| \sum_{l=1}^{N_{SS}} Q(t, l) \right|^2 = A_t B \text{ for all } t = 1 \ldots N_{TX}. \tag{4a}$$

wherein:

$N_{SS}$=number of spatial streams;

$N_{TX}$=number of transmitters;

Q(t,l)=the spatial spreading matrix component at row t, column l;

B=a constant.

The fifth constraint requires that the power within a particular row when the symbol being transmitted is a 1 or a −1 should also be equal to the constant A defined within the third and fourth constraints provided above. Thus, the squared norm of the sum of the symbol $S_l$ (when the symbol $S_l$ is equal to 1 or −1) multiplied by each of the row components of a row should also be equal to the constant A for each row of the spatial spreading matrix, when all the transmit antennas have power amplifiers with similar operating behavior. The fifth constraint can be defined mathematically as:

$$\left| \sum_{l=1}^{N_{SS}} s_l Q(t, l) \right|^2 = A \tag{5}$$

wherein:

$N_{SS}$=number of spatial streams;

Q(t,l)=the spatial spreading matrix component at row t, column l;

A=a constant; and $S_l$=1 or −1 depending on the HT-LTF.

If the transmit antennas have power amplifiers that have different linear operating regions, then the ratio of squared norm of the sum of the symbol $S_l$ (when the symbol $S_l$ is equal to 1 or −1) multiplied by each of the row components of a row, for different rows of the spatial spreading matrix, is the same as the constant sequence designed based on the linear operating regions of the power amplifiers: $\{A_1, A_2, \ldots, A_{NTX}\}$. This constraint is defined mathematically as:

$$\left| \sum_{l=1}^{N_{SS}} s_l Q(t, l) \right|^2 = A_t B \text{ for all } t = 1 \ldots N_{TX}. \tag{5a}$$

wherein:

$N_{SS}$=number of spatial streams;

$N_{TX}$=number of transmitters;

Q(t,l)=the spatial spreading matrix component at row t, column l; and

B=a constant.

Any spatial spreading matrix which satisfies these five constraints (or in some cases, some combination of a subset of these constraints) can be used in any square transmission system (having the same number of spatial streams and transmission antennas) or in any non-square transmission system (having multiple symbol streams of data transmitted via a different number of transmission antennas) to assure equal power output for each of the transmission antennas, averaged over each symbol period. However, the use of a spatial spreading matrix that satisfies these constraints is generally more relevant or useful in cases in which a strict unity DFT matrix cannot be used because of the non-square nature of the transmission system. In particular, a spatial spreading matrix as defined above can be used advantageously in non-square systems and is especially advantageous when the number of transmission antennas is greater than the number of symbol streams and in which the number of symbol streams is greater than or equal to two. Some example spatial spreading matrices which satisfy the five constraints defined above are provided below for a 3×2 system (three transmission antennas used to simultaneously send two spatial streams), a 4×2 system (four transmission antennas used to simultaneously transmit two spatial streams), and a 4×3 system (four transmission antennas used to simultaneously transmit three spatial streams), all with the power amplifiers for different transmit antennas having identical or similar operating behavior.

$$3\times 2: \begin{bmatrix} \sqrt{\frac{1}{3}} & j\sqrt{\frac{1}{3}} \\ \sqrt{\frac{2}{3}}\cos(15°) & -j\sqrt{\frac{2}{3}}\sin(15°) \\ \sqrt{\frac{2}{3}}\sin(15°) & -j\sqrt{\frac{2}{3}}\cos(15°) \end{bmatrix} \quad 4\times 2: \begin{bmatrix} 1/2 & j/2 \\ 1/2 & j/2 \\ 1/2 & -j/2 \\ 1/2 & -j/2 \end{bmatrix}$$

$$4\times 3: \begin{bmatrix} 1/\sqrt{2} & j/2 & 0 \\ 0 & 1/2 & j/\sqrt{2} \\ 1/\sqrt{2} & -j/2 & 0 \\ 0 & -1/2 & j/\sqrt{2} \end{bmatrix}$$

An example of spatial spreading matrix design based of the above constraints for a 3×2 system, with the power amplifier for the first transmit antenna having a linear operating region that is roughly two times the operating region of the other transmit antennas, is shown below:

$$3\times 2: \begin{bmatrix} \sqrt{\frac{1}{2}} & j\sqrt{\frac{1}{2}} \\ \frac{1}{2} & -j\frac{1}{2} \\ \frac{1}{2} & -j\frac{1}{2} \end{bmatrix}$$

However, it is noted that these spatial spreading matrices are not unique for these types of systems, and in fact other and different spatial spreading matrices can be determined for 3×2 systems, 4×2 systems and 4×3 systems which satisfy the five constraints defined herein. Still further, if desired, other spatial spreading matrices may be determined and used for other system sizes or configurations, such as 5×2, 5×3, 5×4, 6×2, 6×3, 6×4, etc. systems. As will be understood, the manner in which the spatial spreading matrices are calculated or determined is not particularly important, as long as the resulting spatial spreading matrices satisfy one or more, and preferably all of the five constraints defined above. Thus, any mathematical, heuristic, iterative, or trial and error method can be used to actually determine or compute any particular size of spatial spreading matrix that satisfies the constraints defined herein, and the method used to compute a spatial spreading matrix that satisfies these constraints (or some combination of these constraints) is not determinative. Moreover, the specific orientation or definition of the "row" and "column" dimensions of a matrix as used herein is arbitrary and is simply based on convention, and therefore may be changed. Thus, for example, the row dimension can be a horizontal dimension with the column dimension being a vertical dimension (as assumed herein), or the row dimension can be a vertical dimension with the column dimension being a horizontal dimension.

If desired, a spatial spreading matrix determined according to the principles defined above may be pre-calculated and stored in the memory 21 of the transmitter 12 and may be used within the spatial spreading block 24 when needed. Still further, as noted above, a number of different spatial spreading matrices may be stored in the memory 21 of the transmitter 12 to be used in different situations, such as when different numbers of encoded spatial streams of data are to be transmitted simultaneously or when different numbers of the transmission antennas 14 are available. Thus, it may be possible to detect the failure of one or more of the antennas 14 and still operate using multiple spatial streams by switching to the use of a new spatial spreading matrix configured to transmit the same number of spatial streams using a fewer number of antennas. Likewise, it may be possible to switch the number of spatial streams being sent via the same number of transmission antennas 14 or to switch both the number of spatial streams being sent and the number of transmission antennas 14 used by simply obtaining from the memory 21 a new spatial spreading matrix designed for the particular combination of the number of spatial streams to be sent and the number of available antennas. In other words, the transmission system may switch between different modes, wherein each mode as a unique combination of number of spatial streams and number of antennas, and a separate or different spatial spreading matrix may be pre-calculated and stored to be used in the spatial spreading block 24 for each of these different modes. However, instead of or in addition to storing pre-determined spatial spreading matrices, one or more spatial spreading matrixes may be calculated during operation of the system by, for example, the spatial spreading matrix calculation unit 28.

Moreover, it will be understood that the actual spatial spreading matrix equations, e.g., the computation of a particular spatial spreading matrix that satisfies the constraints defined above, may be performed at any desired location within the wireless communication system 10 of FIG. 1, including within the controller 20 or other hardware, software, or firmware of the transmitter 12, as well as within the controller 40 or other hardware, software, or firmware of the receiver 16. Alternatively, the spatial spreading matrix may be pre-computed and stored in the memory 21 (or 41) or other memory of the system 10 prior to the transmission system being used. The spatial spreading matrix or matrices may also be computed or determine by a different device and may be sent to the transmitter 12 or the receiver 14 of the transmission system 10 at any desired time.

Of course, the spatial spreading matrix technique described herein is not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith.

While the spatial spreading matrix calculations described herein are described in one example as being implemented in software stored in, for example, one of the memories 21, 41 and implemented on a processor associated with one of the controllers 20, 40, or with the spatial spreading matrix calculation unit 28 of the MIMO communication system 10 of FIG. 1, these routines may alternatively or additionally be implemented in digital or analog hardware, firmware, application specific integrated circuits, etc., as desired. If implemented in software, the routines may be stored in any computer readable memory such as in RAM, ROM, flash memory, a magnetic disk, a laser disk, or other storage medium. Likewise, this software may be delivered to a MIMO system device (such as a transmitter or a receiver) via any known or desired delivery method including, for example, over a communication channel such as a telephone line, the Internet, a wireless connection, etc., or via a transportable medium, such as a computer-readable disk, flash drive, etc.

The present invention may be embodied in any type of wireless communication system including, for example, ones used in wireless computer systems such as those implemented via a local area network or a wide area network, internet, cable and satellite based communication systems (such as internet, data, video and voice communication systems), wireless telephone systems (including cellular phone systems, voice over internet protocol (VoIP) systems, home-based wireless telephone systems, etc.) Referring now to FIGS. 2A-2H, various exemplary implementations of the present invention are shown.

Figure 2A:
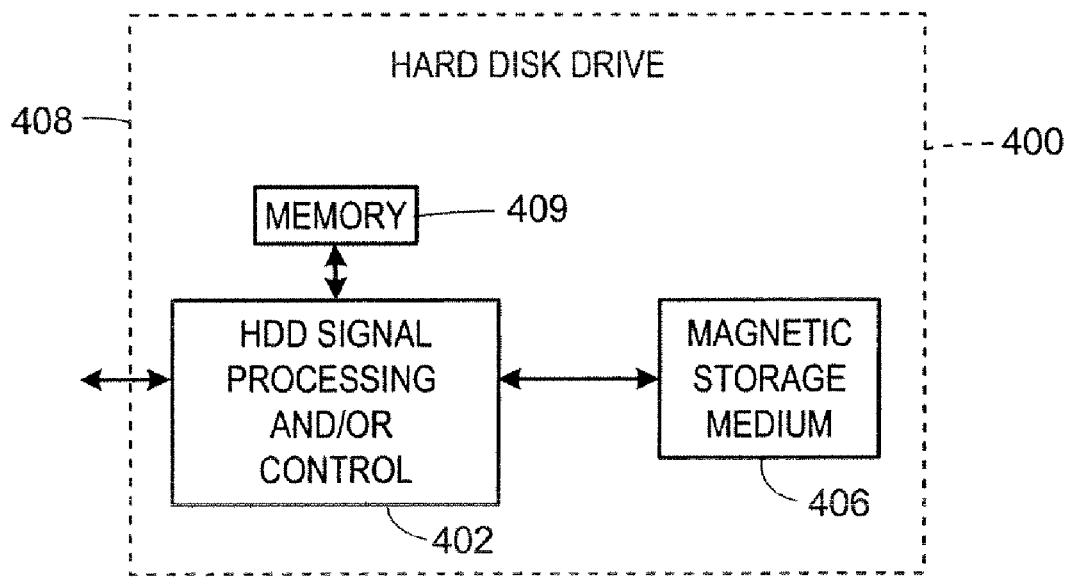
FIGS. 2A-2H illustrate examples of various different devices in which a wireless communication system implementing the transmission techniques described herein may be used.

Referring to FIG. 2A, the present invention may be used with a hard disk drive 400 which includes both signal processing and/or control circuits, which are generally identified in FIG. 2A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408 which may implement the beamforming techniques described above. HDD 400 may be connected to memory 409, such as a random access memory (RAM), a low latency nonvolatile memory such as flash memory, read only memory (ROM) and/or other suitable electronic data storage.

Figure 2B:
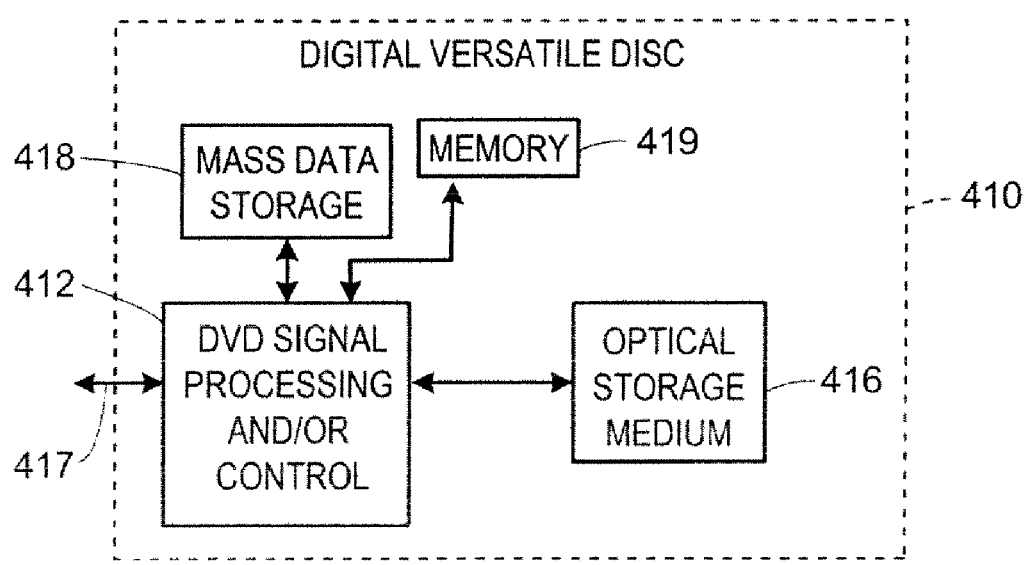

Referring now to FIG. 2B, the present invention may be embodied in or used with a digital versatile disc (DVD) drive 410 which may include either or both signal processing and/or control circuits, which are generally identified in FIG. 2B at 412, and/or mass data storage 418 of DVD drive 410. Signal processing and/or control circuit 412 and/or other circuits (not shown) in DVD 410 may process data, perform coding and/or encryption, perform calculations, and/or format data that is read from and/or data written to an optical storage medium 416. In some implementations, signal processing and/or control circuit 412 and/or other circuits (not shown) in DVD 410 can also perform other functions such as encoding and/or decoding and/or any other signal processing functions associated with a DVD drive.

DVD drive 410 may communicate with an output device (not shown such as a computer, television or other device via one or more wired or wireless communication links 417 which may be implemented using the beamforming techniques described above. DVD 410 may communicate with mass data storage 418 that stores data in a nonvolatile manner. Mass data storage 418 may include a hard disk drive (HDD) such as that shown in FIG. 2A. The HDD may be a mini HDD that includes one or more platters having a diameter that is smaller than approximately 1.8". DVD 410 may be connected to memory 419, such as RAM, ROM, low latency nonvolatile memory such as flash memory, and/or other suitable electronic data storage.

Figure 2C:
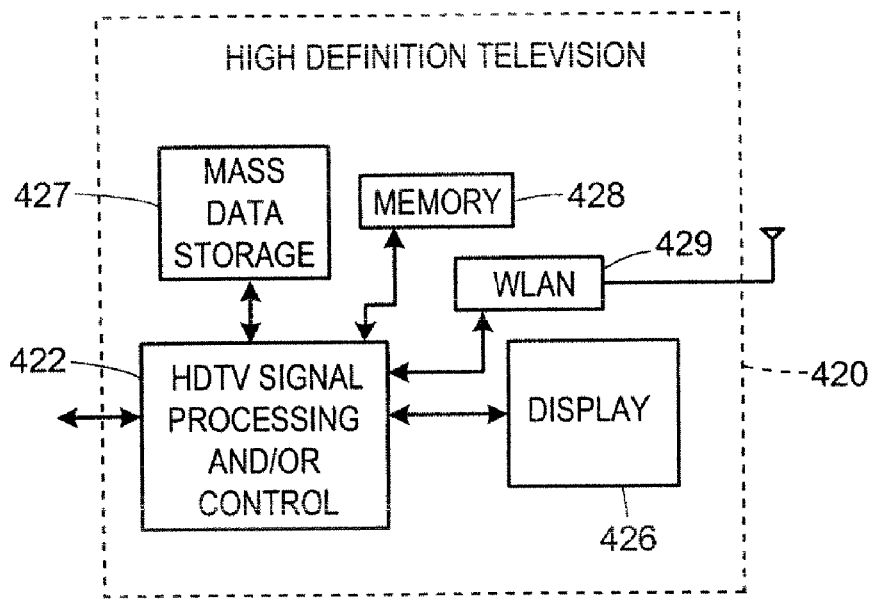

Referring now to FIG. 2C, the present invention may be embodied in a high definition television (HDTV) 420 which may include either or both signal processing and/or control circuits, which are generally identified in FIG. 2C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 2A and/or at least one DVD may have the configuration shown in FIG. 2B. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429 which may implement the beamforming techniques described above.

Figure 2D:
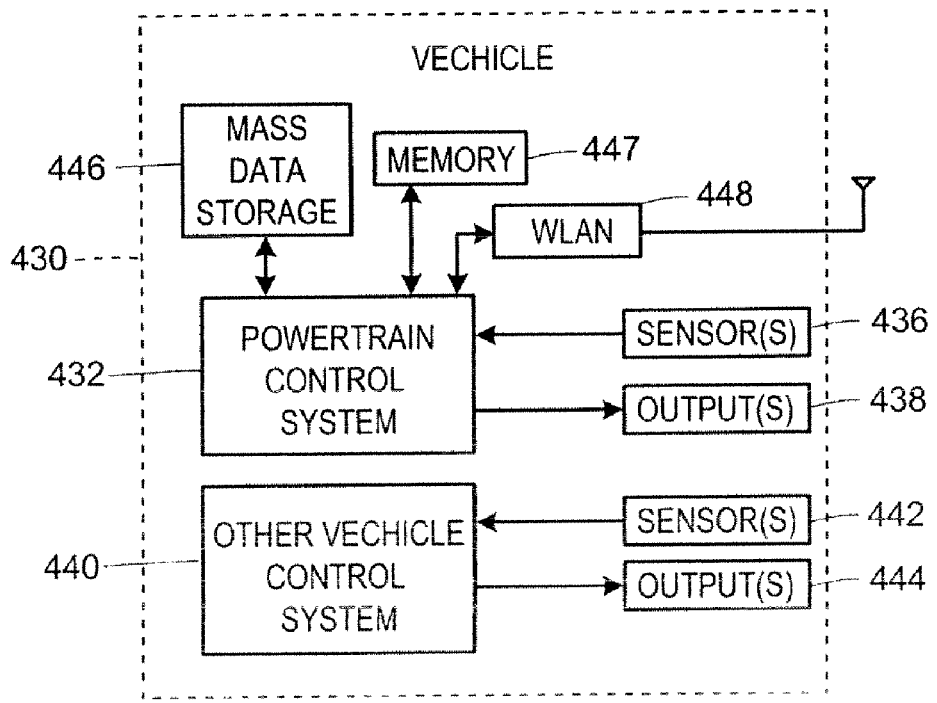

Referring now to FIG. 2D, the present invention may be used in conjunction with a control system of a vehicle 430 having a WLAN interface and/or mass data storage. In some implementations, the present invention may be used within a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 2A and/or at least one DVD may have the configuration shown in FIG. 2B. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448 which may implement the beamforming techniques described above. The control system 440 may also include mass data storage, memory and/or a WLAN interface (all not shown).

Figure 2E:
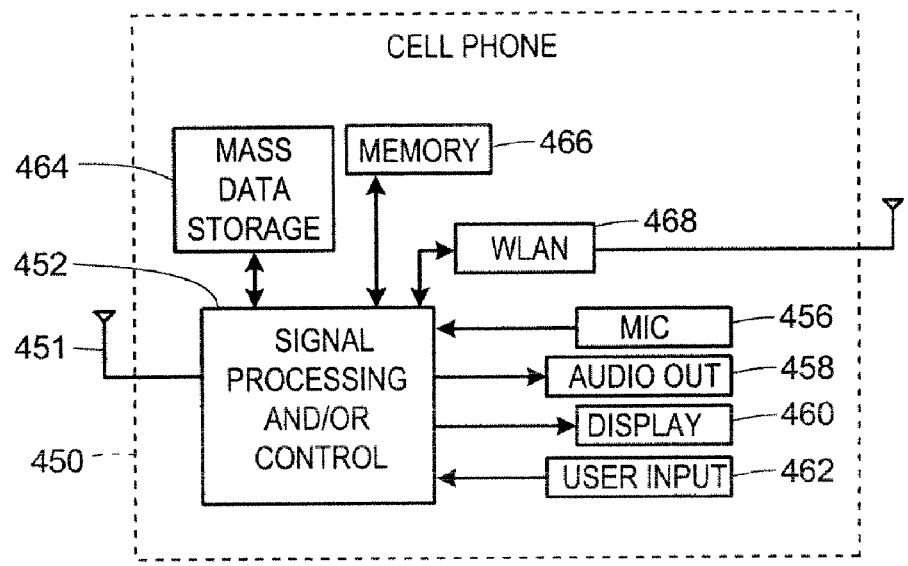

Referring now to FIG. 2E, the present invention may be embodied in a cellular phone 450 that may include one or more cellular antennas 451, either or both signal processing and/or control circuits, which are generally identified in FIG. 2E at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 2A and/or at least one DVD may have the configuration shown in FIG. 2B. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 2F:
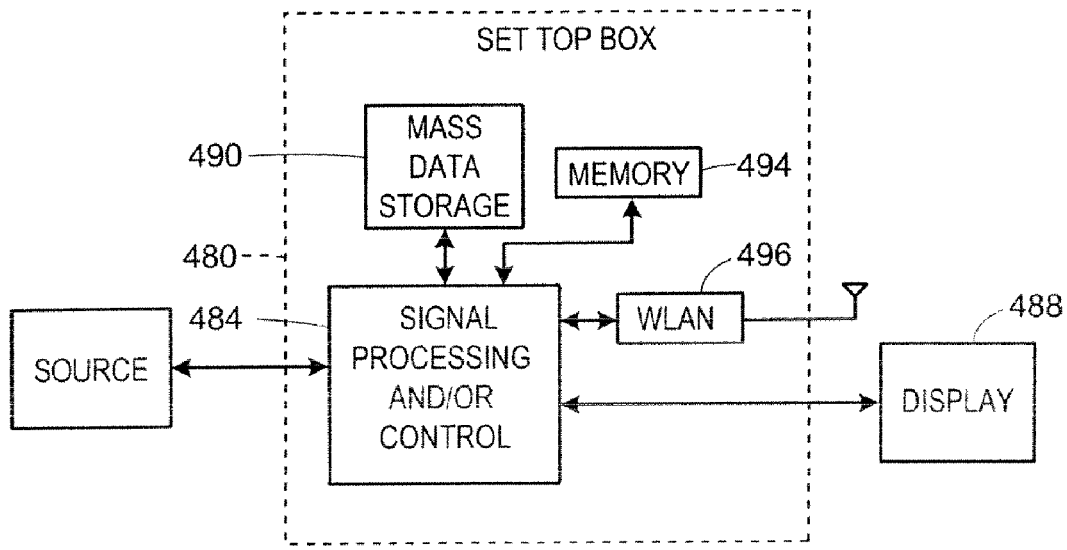

Referring now to FIG. 2F, the present invention may be embodied in a set top box 480 including either or both signal processing and/or control circuits, which are generally identified in FIG. 2F at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 2A and/or at least one DVD may have the configuration shown in FIG. 2B. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496 which may implement the beamforming techniques described herein.

Figure 2G:
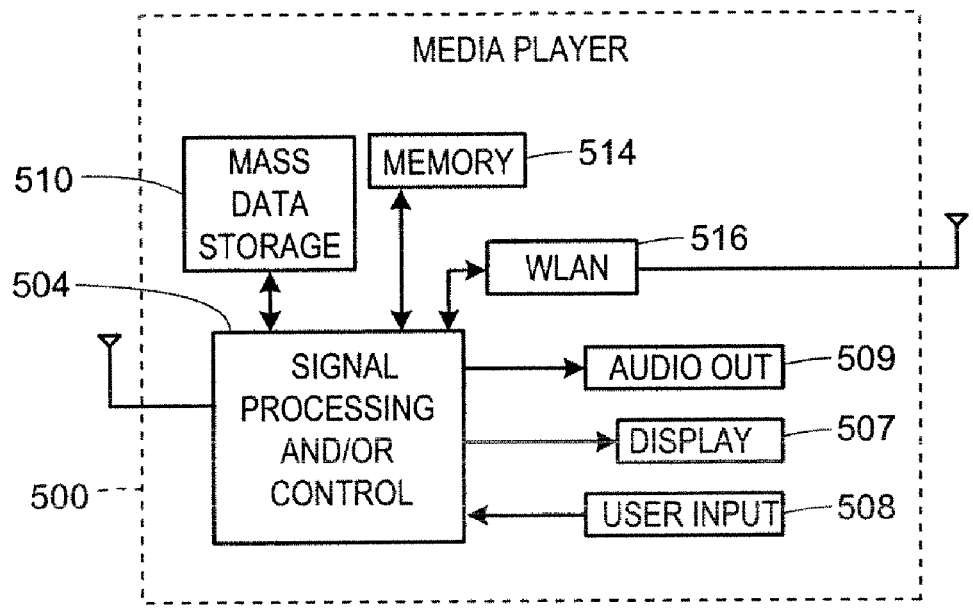

Referring now to FIG. 2G, the present invention may be embodied in a media player 500. The present invention may implement either or both signal processing and/or control circuits, which are generally identified in FIG. 2G at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 2A and/or at least one DVD may have the configuration shown in FIG. 2B. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516 which may implement the beamforming techniques described herein. Still other implementations in addition to those described above are contemplated.

Figure 2H:
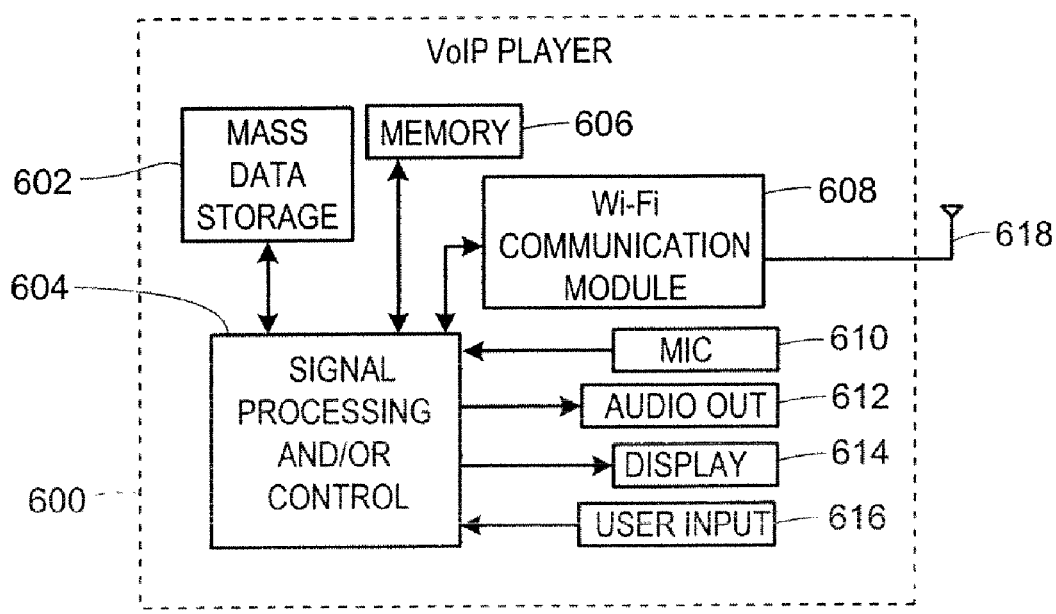

Referring to FIG. 2H, the present invention may be embodied in a Voice over Internet Protocol (VoIP) phone 600 that may include one or more antennas 618, either or both signal processing and/or control circuits, which are generally identified in FIG. 2H at 604, and a wireless interface and/or mass data storage of the VoIP phone 600. In some implementations, VoIP phone 600 includes, in part, a microphone 610, an audio output 612 such as a speaker and/or audio output jack, a display monitor 614, an input device 616 such as a keypad, pointing device, voice actuation and/or other input devices, and a Wireless Fidelity (Wi-Fi) communication module 608. Signal processing and/or control circuits 604 and/or other circuits (not shown) in VoIP phone 600 may process data, perform coding and/or encryption, perform calculations, format data and/or perform other VoIP phone functions.

VoIP phone 600 may communicate with mass data storage 602 that stores data in a nonvolatile manner such as optical and/or magnetic storage devices, for example hard disk drives HDD and/or DVDs. At least one HDD may have the configuration shown in FIG. 2A and/or at least one DVD may have the configuration shown in FIG. 2B. The HDD may be a mini HDD that includes one or more platters having a diameter that is smaller than approximately 1.8". VoIP phone 600 may be connected to memory 606, which may be a RAM, ROM, low latency nonvolatile memory such as flash memory and/or other suitable electronic data storage. VoIP phone 600 is configured to establish communications link with a VoIP network (not shown) via Wi-Fi communication module 608 which may implement the beamforming techniques described herein.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A wireless transmitter for transmitting signals to one or more receivers, the wireless transmitter comprising:

two or more transmission antennas;

a symbol encoder unit that produces two or more encoded spatial data streams wherein the number of the encoded spatial data streams is different than the number of the transmission antennas to be used to transmit the encoded spatial data streams; and a spatial spreading unit coupled between the symbol encoder unit and the transmission antennas, the spatial spreading unit including a spatial spreading matrix to distribute the two or more encoded spatial data streams to the transmission antennas for transmission;

wherein the spatial spreading matrix has components associated with each row of a row dimension having a number of rows equal to the number of the transmission antennas to be used to transmit the encoded spatial data streams and associated with each column of a column dimension having a number of columns equal to the number of the encoded spatial data streams to be transmitted;

wherein the ratio of squared norms of the sums of the components of the different rows of the spatial spreading matrix is constrained to be the same as a first constant pre-determined sequence.

2. The wireless transmitter of claim 1, wherein the ratio of squared norms of the sum of a symbol $S_l$ being transmitted, when the symbol $S_l$ is equal to 1 or −1, multiplied by each of the components of a row of the spatial spreading matrix, for different rows of the spatial spreading matrix, is equal to a second constant pre-determined sequence.

3. The wireless transmitter of claim 2, wherein the second constant pre-determined sequence is equal to the first constant pre-determined sequence.

4. The wireless transmitter of claim 3, wherein the ratio of the sum of the squared norms of the components of a row, for different rows of the spatial spreading matrix, is equal to the second constant pre-determined sequence.

5. The wireless transmitter of claim 4, wherein the sum of the squared norms of the components of a column of the spatial spreading matrix is the same for all of the columns of the spatial spreading matrix.

6. The wireless transmitter of claim 5, wherein an inner product of any two different columns of the spatial spreading matrix is equal to zero for every set of two different columns of the spatial spreading matrix.

7. The wireless transmitter of claim 1, wherein the ratio of the sum of the squared norms of the components of a row, for different rows of the spatial spreading matrix, is equal to a second constant pre-determined sequence, and wherein the second constant sequence is equal to the first constant pre-determined sequence.

8. The wireless transmitter of claim 7, wherein the sum of the squared nouns of the components of a column of the spatial spreading matrix is the same for each column of the spatial spreading matrix.

9. The wireless transmitter of claim 8, wherein an inner product of any two different columns of the spatial spreading matrix is equal to zero for every set of two different columns of the spatial spreading matrix.

10. The wireless transmitter of claim 1, wherein the number of the encoded spatial data streams to be transmitted is less than the number of the transmission antennas used to transmit the encoded spatial data streams.

11. The wireless transmitter of claim 1, further comprising a controller that provides two or more spatial spreading matrices to the spatial spreading matrix unit at different times, wherein each of the two or more spatial spreading matrices relates to a different combination of a number of encoded spatial data streams and a number of transmission antennas, and wherein the ratio of squared norms of the sums of the components of a row for different rows of each of the two or more spatial spreading matrices is equal to a constant sequence.

12. The wireless transmitter of claim 1, further comprising a memory that stores two or more spatial spreading matrices, wherein each of the two or more spatial spreading matrices relates to a different combination of a number of encoded spatial data streams and a number of transmission antennas, and wherein the ratio of squared norms of the sums of the components of a row for different rows of each of the two or more spatial spreading matrices is equal to a constant sequence.

13. The wireless transmitter of claim 1, further comprising a spatial spreading matrix calculation unit that calculates the spatial spreading matrix.

14. A wireless transmitter for transmitting signals to one or more receivers, the wireless transmitter comprising:
   two or more transmission antennas;
   a symbol encoder unit that produces two or more encoded spatial data streams, wherein the number of the encoded spatial data streams is different than the number of the transmission antennas to be used to transmit the encoded spatial data streams of data; and
   a spatial spreading unit coupled between the symbol encoder unit and the transmission antennas, the spatial spreading unit including a spatial spreading matrix to distribute the two or more encoded spatial data streams to the transmission antennas for transmission;
   wherein the spatial spreading matrix has components associated with each row of a row dimension having a number of rows equal to the number of the transmission antennas to be used to transmit the encoded spatial data streams and associated with each column of a column dimension having a number of columns equal to the number of the encoded spatial data streams to be transmitted, and wherein the ratio of squared norms of the sum of a symbol S/being transmitted, when the symbol $S_l$ is equal to 1 or −1, multiplied by each of the components of a row of the spatial spreading matrix, for different rows of the spatial spreading matrix, is equal to a first constant sequence.

15. The wireless transmitter of claim 14, wherein the ratio of the sum of the squared norms of the components of a row, for each of a set of different rows of the spatial spreading matrix, is equal to a second constant sequence.

16. The wireless transmitter of claim 15, wherein the second constant sequence is equal to the first constant sequence.

17. The wireless transmitter of claim 15, wherein the sum of the squared norms of the components of a column of the spatial spreading matrix is the same for each column of the spatial spreading matrix.

18. The wireless transmitter of claim 17, wherein an inner product of any two different columns of the spatial spreading matrix is equal to zero for every set of two different columns of the spatial spreading matrix.

19. The wireless transmitter of claim 15, wherein an inner product of any two different columns of the spatial spreading matrix is equal to zero for every set of two different columns of the spatial spreading matrix.

20. The wireless transmitter of claim 14, wherein the number of the encoded spatial data streams to be transmitted is less than the number of the transmission antennas used to transmit the encoded spatial data streams.

21. The wireless transmitter of claim 14, further comprising a controller that provides two or more spatial spreading matrices to the spatial spreading unit at different times, wherein each of the two or more spatial spreading matrices relates to a different combination of a number of encoded spatial data streams and a number of transmission antennas, and wherein the ratio of squared norms of the sum of a symbol $S_l$ being transmitted, when the symbol $S_l$ is equal to 1 or −1, multiplied by each of the components of a row, for different rows of each of the two or more spatial spreading matrices is equal to a constant sequence.

22. The wireless transmitter of claim 14, further comprising a memory that stores two or more spatial spreading matrices, wherein each of the two or more spatial spreading matrices relates to a different combination of a number of encoded spatial data streams and a number of transmission antennas, and wherein the ratio of squared norms of the sum of a symbol $S_l$ being transmitted, when the symbol $S_l$ is equal to 1 or −1, multiplied by each of the components of a row, for different rows of each of the two or more spatial spreading matrices, is equal to a predetermined constant sequence for each of the two or more spatial spreading matrices.

23. The wireless transmitter of claim 14, further comprising a spatial spreading matrix calculation unit that calculates the spatial spreading matrix.

24. A method of wirelessly transmitting data via a plurality of transmission antennas, comprising:
   encoding the data to produce two or more encoded spatial data streams for transmission via a number of the transmission antennas;
   using a spatial spreading matrix to distribute the two or more encoded spatial data streams to the number of the transmission antennas, wherein the spatial spreading matrix has components associated with each row of a row dimension having a number of rows equal to the number of the transmission antennas to be used to transmit the encoded spatial data streams and a column dimension having a number of columns equal to the number of the encoded spatial data streams to be transmitted, and wherein the ratio of squared norms of the sums of the components of a row, for different rows of the spatial spreading matrix, is equal to a first constant sequence; and
   simultaneously transmitting the distributed encoded spatial data streams via the number of the transmission antennas;
   wherein the number of the encoded spatial data streams of data is different than the number of the transmission antennas.

25. The method of claim 24, wherein the ratio of squared norms of the sum of a symbol $S_l$ being transmitted, when the symbol $S_l$ is equal to 1 or −1, multiplied by each of the components of a row, for different rows of the spatial spreading matrix, is equal to a second constant sequence.

26. The method of claim 25, wherein the second constant sequence is equal to the first constant sequence.

27. The method of claim 25, wherein an inner product of any two different columns of the spatial spreading matrix is equal to zero for every set of two different columns of the spatial spreading matrix.

28. The method of claim 27, wherein the sum of the squared norms of the components of a column of the spatial spreading matrix is the same for each of the columns of the spatial spreading matrix.

29. The method of claim 28, wherein the ratio of the sum of squared norms of the components of a row, for different rows of the spatial spreading matrix, is equal to the second constant sequence.

30. The method of claim 29, wherein the second constant sequence is equal to the first constant sequence.

31. The method of claim 24, wherein the ratio of the sum of squared norms of the components of a row, for different rows of the spatial spreading matrix, is equal to a second constant sequence.

32. The method of claim 31, wherein an inner product of any two different columns of the spatial spreading matrix is equal to zero for every set of two different columns of the spatial spreading matrix.

33. The method of claim 31, wherein the second constant sequence is equal to the first constant sequence.

34. The method of claim 24, wherein the sum of the squared norms of the components of a column of the spatial spreading matrix is the same for each column of the spatial spreading matrix.

35. The method of claim 34, wherein the ratio of the sum of squared norms of the components of a row for different rows of the spatial spreading matrix is equal to a second constant sequence.

36. The method of claim 24, wherein an inner product of any two different columns of the spatial spreading matrix is equal to zero for every set of two different columns of the spatial spreading matrix.

37. The method of claim 36, wherein the sum of the squared norms of the components of a column of the spatial spreading matrix is the same for each column of the spatial spreading matrix.

38. The method of claim 37, wherein the ratio of the sum of squared norms of the components of a row for different rows of the spatial spreading matrix is equal to a second constant sequence.

39. The method of claim 24, wherein the number of the encoded spatial data streams is less than the number of the transmission antennas used to transmit the encoded spatial data streams.

40. The method of claim 24, further comprising using different spatial spreading matrices, each of which is designed for a different combination of a number of encoded spatial data streams and a number of transmission antennas, at different times to transmit two or more encoded spatial data streams via three or more transmission antennas, wherein the ratio of squared norms of the sum of the components of a row, for different rows of each of the different spatial spreading matrices is equal to a predetermined constant sequence.

41. The method of claim 24, further comprising storing different spatial spreading matrices, each of which is designed for a different combination of a number of encoded spatial data streams and a number of transmission antennas, and using different ones of the stored spatial spreading matrices at different times to transmit two or more encoded spatial data streams via three or more transmission antennas, wherein the ratio of squared norms of the sums of the components of a row, for different rows of each of the different stored spatial spreading matrices, is equal to a predetermined constant sequence.

42. The method of claim 24, wherein the spatial spreading matrix includes four or more rows and three or more columns.

43. The method of claim 24, wherein the spatial spreading matrix includes five or more rows and four or more columns.

44. A method of wirelessly transmitting data via a plurality of transmission antennas, comprising:
encoding the data to produce two or more encoded spatial data streams for transmission via a number of the transmission antennas;
using a spatial spreading matrix to distribute the two or more encoded spatial data streams to the number of the transmission antennas, wherein the spatial spreading matrix has components associated with each row of a row dimension having a number of rows equal to the number of the transmission antennas to be used to transmit the encoded spatial data streams and a column dimension having a number of columns equal to the number of the encoded spatial data streams to be transmitted, and wherein the ratio of squared norms of the sum of a symbol $S_l$ being transmitted, when the symbol $S_l$ is equal to 1 or −1, multiplied by each of the components of a row, for different rows of the spatial spreading matrix, is equal to a first constant sequence; and
transmitting the distributed encoded spatial data streams via the number of the transmission antennas;
wherein the number of the encoded spatial data streams is different than the number of the transmission antennas.

45. The method of claim 44, wherein the sum of the squared norms of the components of a column of the spatial spreading matrix is the same for each column of the spatial spreading matrix.

46. The method of claim 44, an inner product of any two different columns of the spatial spreading matrix is equal to zero for every set of two different columns of the spatial spreading matrix.

47. The method of claim 46, wherein the sum of the squared norms of the components of a column of the spatial spreading matrix is the same for each column of the spatial spreading matrix.

48. The method of claim 46, wherein the ratio of the sum of squared norms of the components of a row for different rows of the spatial spreading matrix is equal to a second constant sequence.

49. The method of claim 48, wherein the sum of the squared norms of the components of a column of the spatial spreading matrix is the same for each column of the spatial spreading matrix.

50. The method of claim 44, the ratio of the sum of squared norms of the components of a row for different rows of the spatial spreading matrix is equal to a second constant sequence.

51. The method of claim 50, wherein the sum of the squared norms of the components of a column of the spatial spreading matrix is the same for each column of the spatial spreading matrix.

52. The method of claim 44, wherein the number of the encoded spatial data streams is less than the number of the transmission antennas used to transmit the encoded spatial data streams.

53. The method of claim 44, further comprising using different spatial spreading matrices, each of which is associated with a different combination of a number of encoded spatial data streams and a number of transmission antennas, at different times to transmit two or more encoded spatial data streams via three or more transmission antennas, wherein the ratio of squared norms of the sum of a symbol $S_j$ being transmitted, when the symbol $S_j$ is equal to 1 or −1, multiplied by each of the components of a row for different rows of each of the different spatial spreading matrices is equal to a predetermined constant sequence.

54. The method of claim 44, further comprising storing two or more different spatial spreading matrices, each of which is associated with a different combination of a number of encoded spatial data streams and a number of transmission antennas, and using the different stored spatial spreading matrices at different times to transmit two or more encoded data spatial streams via three or more transmission antennas, wherein the ratio of squared norms of the sum of a symbol $S_j$ being transmitted, when the symbol $S_j$ is equal to 1 or −1, multiplied by each of the components of a row for different rows of each of the spatial spreading matrices is equal to a predetermined constant sequence.

55. The method of claim 44, wherein the spatial spreading matrix includes four or more rows and three or more columns.

56. The method of claim 44, wherein the spatial spreading matrix includes five or more rows and four or more columns.

57. A wireless transmitter for transmitting signals to one or more receivers, the wireless transmitter comprising:
   three or more transmission antennas;
   a symbol encoder unit that produces two or more encoded spatial data streams for transmission, wherein the number of the encoded spatial data streams is different than the number of the transmission antennas to be used to transmit the encoded spatial data streams; and
   a spatial spreading unit coupled between the symbol encoder unit and the transmission antennas, the spatial spreading unit including a spatial spreading matrix to distribute the two or more encoded spatial data streams to the transmission antennas for transmission;
   wherein the spatial spreading matrix has components associated with each row of a row dimension having a number of rows equal to the number of the transmission antennas to be used to transmit the encoded spatial data streams and a column dimension having a number of columns equal to the number of the encoded spatial data streams to be transmitted, and wherein the spatial spreading matrix satisfies one or more of the following two constraints;

(1) the ratio of squared norms of the sum of the components of a row, for different rows of the spatial spreading matrix, is equal to a first constant sequence; and (2) the ratio of squared norms of the sum of a symbol $S_j$ being transmitted, when the symbol $S_j$ is equal to 1 or −1, multiplied by each of the components of a row, for different rows of the spatial spreading matrix, is equal to a second constant sequence.

58. The wireless transmitter of claim 57, wherein the spatial spreading matrix satisfies both of the constraints (1) and (2).

59. The wireless transmitter of claim 58, wherein the first constant sequence is equal to the second constant sequence.

60. The wireless transmitter of claim 57, wherein the spatial spreading matrix further satisfies one or more of the following three constraints:
   (a) the the sum of squared norms of the components of a column of the spatial spreading matrix is the same for each column of the spatial spreading matrix;
   (b) an inner product of any two different columns of the spatial spreading matrix is equal to zero for every set of two different columns of the spatial spreading matrix; and
   (c) the ratio of squared norms of the sums of the components of a row for different rows of the spatial spreading matrix is equal to the second constant sequence.

61. The wireless transmitter of claim 60, wherein the spatial spreading matrix satisfies two of the constraints (a), (b) and (c).

62. The wireless transmitter of claim 60, wherein the spatial spreading matrix satisfies all three of the constraints (a), (b) and (c).

63. The wireless transmitter of claim 60, wherein the spatial spreading matrix satisfies both of the constraints (1) and (2).

64. The wireless transmitter of claim 63, wherein the spatial spreading matrix satisfies at least two of the constraints (a), (b) and (c).

65. The wireless transmitter of claim 63, wherein the spatial spreading matrix satisfies all three of the constraints (a), (b) and (c).

66. The method of claim 57, wherein the spatial spreading matrix includes four or more rows and three or more columns.

67. The method of claim 57, wherein the spatial spreading matrix includes five or more rows and four or more columns.

* * * * *